United States Patent [19]

Ochiai

[11] 4,240,071
[45] Dec. 16, 1980

[54] DIGITAL CIRCUIT FOR CONDITIONING THE OPERATION OF A MOTOR VEHICLE UPON THE TESTED MOTOR ABILITY OF THE OPERATOR

[75] Inventor: Takeshi Ochiai, Toyota, Japan

[73] Assignee: Toyota Jidosha Kogyo Kabushiki Kaisha, Toyota, Japan

[21] Appl. No.: 20,050

[22] Filed: Mar. 13, 1979

Related U.S. Application Data

[63] Continuation of Ser. No. 814,393, Jul. 11, 1977, abandoned.

[30] Foreign Application Priority Data

Jul. 9, 1976 [JP] Japan .................................. 51-82328

[51] Int. Cl.³ ...................... G08B 23/00; B60K 27/08
[52] U.S. Cl. .................................... 340/576; 340/573; 340/64; 180/173; 180/272; 307/10 AT
[58] Field of Search ................. 340/576, 573, 575, 53, 340/64; 180/99, 114, 173, 272; 307/10 AT; 361/171, 172; 128/2 N

[56] References Cited

U.S. PATENT DOCUMENTS

| | | | |
|---|---|---|---|
| 3,312,508 | 4/1967 | Keller et al. | 340/52 R |
| 3,735,381 | 5/1973 | Zadig | 340/576 |
| 3,755,776 | 8/1973 | Kotras | 340/576 |
| 3,866,168 | 2/1975 | McGuirk | 307/10 AT |
| 3,886,540 | 5/1975 | Sussman et al. | 340/53 |
| 3,942,151 | 3/1976 | Takeuchi | 340/576 |
| 4,004,290 | 1/1977 | Kobayashi et al. | 340/576 |
| 4,058,113 | 11/1977 | Fields | 128/2 N |
| 4,158,198 | 6/1979 | Ochiai | 340/576 |

*Primary Examiner*—John W. Caldwell, Sr.
*Assistant Examiner*—Donnie L. Crosland
*Attorney, Agent, or Firm*—Koda and Androlia

[57] ABSTRACT

A digital circuit for the prohibition of operation of a motor vehicle by an intoxicated person may be fabricated by combining an ignition switch with an engine locking and unlocking means, timing means, sensing means and an indication means. The normal ignition circuit of a motor vehicle is interrupted by an engine locking and unlocking means. A timing signal is generated by the timing means in response to signals received from a clock and a sensing means which in turn is responsive to the performance of the operator in a motor ability test such as the ability to maintain a predetermined amount of steady pressure on a brake pedal. If the operator is successfully performing the test, an indication means produces a first cognizable signal which indicates a successful performance. After the operator has successfully performed the test for a predetermined duration as determined by the count stored in a register, a second cognitive signal is produced by the indication means which indicates that the operator is qualified to operate the vehicle. The normal ignition circuit is then completed by the engine locking and unlocking means in response to the timing signal. The motor vehicle may then be started in the conventional fashion.

1 Claim, 2 Drawing Figures

DIGITAL CIRCUIT FOR CONDITIONING THE OPERATION OF A MOTOR VEHICLE UPON THE TESTED MOTOR ABILITY OF THE OPERATOR

This is a continuation of application Ser. No. 814,393 filed July 11, 1977, now abandoned.

BACKGROUND OF THE INVENTION

1. Field of Invention

The present invention is a digital circuit for prohibiting the improper operation of a vehicle by a physically unfit operator and specifically concerns a circuit for prohibiting the improper operation of a vehicle by such an unfit operator in which a steady control task is imposed on the operator for a designated period of time as a means of evaluating his fitness to operate the vehicle.

2. Description of the Prior Art

The operation of a vehicle, such as an automobile, requires that the vehicle operator be in a mentally and physically stable condition at all times. The ability of a vehicle operator to operate a vehicle is affected by the influence of alcohol, overwork, imperfect health, drugs, and other temporarily disabilitating agents. The operation of a vehicle under such mentally and physically abnormal conditions is extremely dangerous to the person and property of both the operator and the public at large. Devices for determining the unfitness of such operators to operator a vehicle, and for prohibiting the operation of the vehicle involved, has been proposed in the past. In conventional devices of this type, the vehicle operator is given, as a test, appropriate tasks to perform before starting the vehicle into motion. The engine may be started only if the operator shows a sufficient response to the test. Conventional tasks have required the demonstration of an ability to perform simple calculations, tasks which test reflex characteristics or other movement reactions. Among such tasks used for testing, it is known that a steady control task is able to relatively accurately evaluate the fitness of a vehicle operator, and that is is particularly suited for the detection of temporary disability due to the influence of alcohol or other similarly intoxicating drugs. The term "steady control task" refers to a task which requires the continuous maintenance of a designated exertion of a bodily force or position for a predetermined period of time by the vehicle operator, such as, for example, the maintenance of a uniform foot pressure on an operating pedal, such as a brake, clutch, or gas pedal.

In conventional circuits employing a steady control task, evaluation of force to determine whether it is within the acceptable range is extremely complicated and the evaluating circuit typically requires a complex frequency measuring circuit and other such analysis and disposition circuits. This increases the cost of the system, and also increases the number of possible sources of system malfunction. The mandatory characteristics required in a device, which prohibits the improper operation of a vehicle due to temporary operator disability, is consistent and uniform performance, and high reliability. It is clear that the main problem for this type of device is that since its main function is to selectively disable the operation of the vehicle and since the evaluating device must be used in order to start the engine, such a device must have an extraordinarily high degree of reliability. What is needed then is a steady control task apparatus or circuit for prohibiting the improper operation of a vehicle due to temporary disability of the vehicle operator. The device must be characterized by simplicity, low cost and a high degree of reliability.

BRIEF SUMMARY OF THE INVENTION

The present invention is a digital circuit for prohibiting operation of a vehicle by a person failing to perform a predetermined motor ability test. The present invention comprises an ignition switch, an engine locking and unlocking means, a clock, a timing means, a sensing means, a counting means and a logic indication means. The ignition switch is coupled to a source of electrical power. The engine locking and unlocking means is coupled to the ignition switch and is employed for selectively coupling a starting signal to the vehicle in response to an indicator signal. The timing means is coupled to the engine locking and unlocking means and generates a plurality of validity signals in response to coincidence between a performance signal and the clock signals. The sensing means is coupled to the timing means and generates the performance signal in response to the performance of the person on the selected motor ability test. The counting means accumulates the plurality of validity signals. Finally, the logic indication means is coupled to the timing means and counting means, and generates at least one indicator signal in response to the plurality of validity signals and the accumulated count within the counting means. The timing means of the present invention may generate the validity signal according to the success of the person in performing a steady control task for a predetermined time duration or count.

The method of the present invention is a circuit for conditioning the operation of a motor vehicle upon the performance of the vehicle operator on a motor ability test comprises the steps of sensing the force exerted by the vehicle operator in a steady control task. The duration of time in which the force is continually maintained within a predetermined range is measured by storing a count from a coincidence clock in a register or counting means. The coincidence clock generates a count whenever the force is maintained within a predetermined range during a clock interval. A plurality of cognizable signals indicating that the force is being maintained within the predetermined range and for a predetermined duration is generated. An indicator signal used to actuate an engine locking means for selectively permitting conventional initiation of the motor vehicle is then generated when the motor ability test is successfully completed.

The method of the present invention includes the case wherein the step of measuring the duration of time includes counting the plurality of cognizable signals and wherein the step of generating the validity signal includes terminating the generation of the plurality of cognizable signals and comparing the number of counted cognizable signals with a predetermined reference number to generate the indicator signal when the counted number and reference number match. Otherwise, the count of cognizable signals is reinitialized.

DETAILED DESCRIPTION OF THE PREFERRED EMBODIMENTS

The present invention is a circuit for prohibiting the improper operation of a vehicle by a temperarily disabled vehicle operator. The circuit contains a sensing means which detects as an electronic on/off signal, a task performed by the vehicle operator in which the operator continuously maintains a designated holding force for a predetermined period of time. A timing means generates, according to the on/off signals of the sensing means, a plurality of validity signals during the time in which the designated holding force is maintained. The counting means accumulates the counts. The logic indication means generates an indicator signal when the accumulated count reaches a predetermined duration. An engine locking and unlocking means closes the normally open conventional ignition circuit to permit starting of the vehicle. The indication means may include a cognitive feedback signal to the vehicle operator both as to the status of his performance during the test as well as his ultimate successful or unsuccessful performance.

The present invention is particularly advantageous in that: (1) the holding force employed in the steady control task is detected as an electronic on/off signal; (2) the timing means is a circuit which is activated according to this on/off signal; and (3) the locking and unlocking means is activated to permit operation of the vehicle only when the vehicle operator has satisfactorily performed the steady control task for a predetermined period of time. The present invention and its various embodiments may be better understood by referring to FIG. 1.

Figure 1:
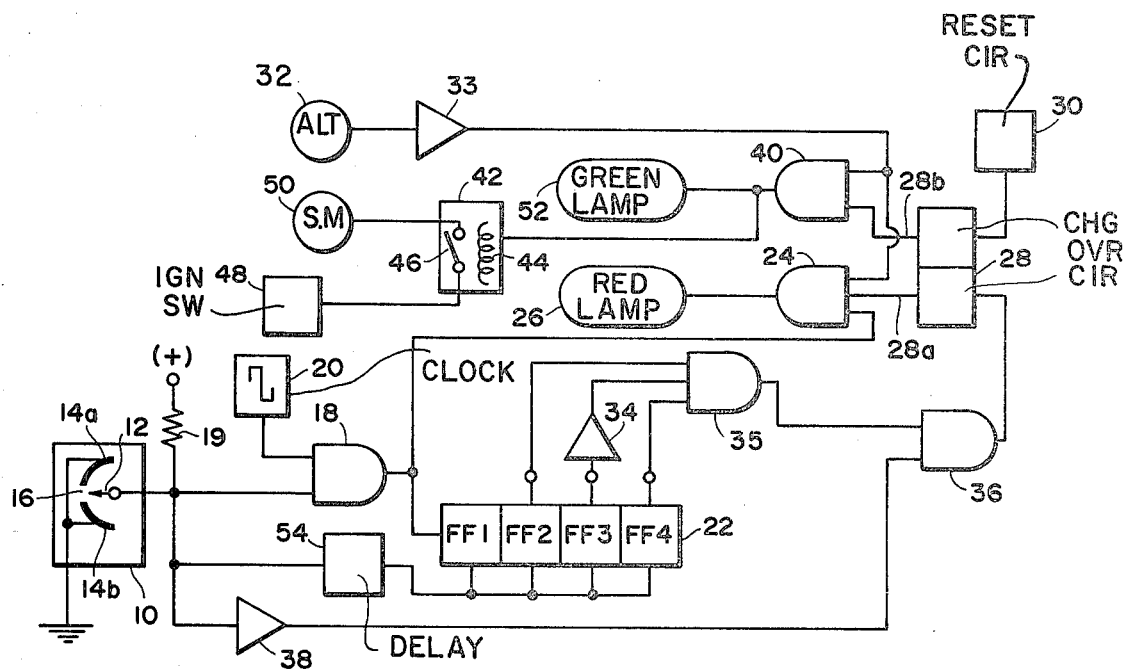
FIG. 1 is a schematic diagram of one embodiment of the present invention.

FIG. 1 illustrates one embodiment of the present invention. Movable contact 12 of sensing means 10 may be coupled to one of the input terminals of an and gate 18. The input terminal of and gate 18 is supplied with voltage from a positive terminal of a battery through a resistor 19. When sensing means 10 is in an "off" state, an input signal is received by and gate 18. When sensing means 10 is in an "on" condition, in which movable contact 12 has made contact with one of fixed contacts 14a or 14b, and gate 18 is grounded and the input signal is interrupted. The other input terminal of and gate 18 is coupled to a pulse generator or clock 20 which sends clock pulses possessing a fixed period to and gate 18. Clock 20, which contains a universally known oscillating circuit and frequency dividing circuit, sends one pulse every few seconds, chosen according to design choice, to one of the input terminals of and gate 18. The output of and gate 18 is coupled to a counter 22. In the embodiment shown in FIG. 1, counter 22 is comprised of a well known binary counter using multiple flip-flops coupled serially in four states, FF1, FF2, FF3 and FF4. Counter 22 counts the clock pulses generated by clock 20 while and gate 18 is receiving an input signal from sensing means 10.

The output of and gate 18 is also coupled to an indicator 26 capable of producing a cognizable signal through another and gate 24. Indicator 26 typically is comprised of an incandescent lamp which is installed within the operator's vision. The vehicle operator is able to observe the flashing of indicator lamp 26 while he is successfully performing the constant task test. A reset circuit 30, well known to the art, is coupled to and gate 24 through a change over circuit 28 comprised in turn of two flip-flops. Before the steady control task is performed, reset circuit 30 causes terminal 28a of changeover circuit 28 to send out an output signal. This condition continues until a changeover or validity signal, as described below, is fed into changeover circuit 28. Furthermore, the output voltage from alternator 32 is coupled through an inverter 33 to a third input terminal of and gate 24. Before the engine of the vehicle is started, alternator 32 has no output voltage as a result, and gate 24 receives an input signal through inverter 33. Accordingly, during the successful performance of the steady control task, and gate 24 causes indicating lamp 26 to flash every time an output signal is generated from and gate 18. By watching indicating lamp 26 and counting the number of times it flashes, the vehicle operator is able to determine the number of clock pulses sent from clock 20 to counter 22 while he is successfully maintaining the predetermined amount of force as measured by sensing means 10.

Figure 2:
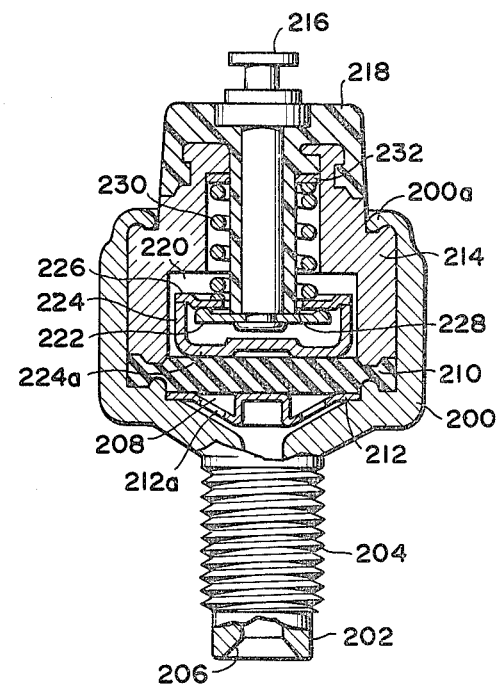
FIG. 2 is a section view of one embodiment of the sensing memeber of this invention.

One example construction of the sensing member 10 is shown in FIG. 2 wherein like reference numerals are applied to like elements or parts.

As shown, a metallic casing 200 forms at the lower end a fluid pressure conducting pipe 202 having male threads 204 therearound and provided with a flare coupling 206 for introduction of the fluid pressure. This fluid pressure or oil-hydraulic pressure conducting pipe 202 is communicated with a fluid pressure chamber 208 defined by a rubber made diaphragm 210 which is supported at the lower side by a support plate 212 in chamber 208 while being sandwitched of its circumferential portion between casing 200 and a metallic bushing 214. On metallic bushing 214, is securely supported on electrode 216 through an insulator 218, which electrode 216 extends into an upper chamber 220 defined above diaphragm 210. FIG. 3 shows the position of electrode 216 wherein its lower end is spaced a predetermined distance from diaphragm 210 as no fluid pressure acts in chamber 208.

At the lower end of electrode 216, is supported a radially extending fixed contact element 222 formed integral with electrode 216.

In chamber 220 above diaphragm 210, is provided a movable contact element 224 formed integral with diaphragm 210. This movable contact 224 is in the shape of a bottomed cylinder positioned as surrounding above fixed contact element 222, and is composed of a cylindrical portion with the bottom being secured to diaphragm 210, and a cap-like disc 226 having a central opening 228 through which electrode 216 extends. By means of a spring 230 disposed between a washer 232 and disc 226, both movable contact 224 and disphragm 210 are biased in the direction to compress fluid pressure chamber 208. Washer 232 is disposed in such manner as to make electrical contact with part of bushing 214.

Diaphragm 210 is normally urged by spring 230 through movable contact 224 in the direction to compress chamber 208, however diaphragm 210 is restrained of its further downward movement beyond the position shown. Support plate 212 forms apertures 212a for communication of fluid pressure in chamber 208. Casing 200 is caulked around its upper circumference 200a thereby to secure bushing 214.

It is arranged that when diaphragm 210 is in its normal position without deformation as shown while fluid pressure in chamber 208 is maintained below a predermined level, fixed contact element 222 is in contact with the lower side surface of disc plate 226.

This sensing member will operate as follows.

When fluid pressure to be sensed is fed into chamber 208 through conducting pipe 202, fixed contact element 222 will remain in contact with disc plate 226 under the influence of spring 230 biasing diaphragm 210 into the position shown, until the fluid pressure attains a predetermined value. Thus, a circuit is made through electrode 216, fixed contact element 222, disc plate 226, spring 230, washer 232, bushing 214 and casing 200, so that sensing member 50 is in the state of "on".

When the fluid pressure within chamber 208 exceeds the predetermined level, diaphragm 210 is deflected upward against spring 230 to move movable contact element 224 upward, thus disc 226 is moved away from fixed contact element 222 so that sensor now issues an "off" signal.

As the fluid pressure further increases to exceed a further predetermined value, the deflection of diaphragm 210 will increase accordingly so that bottom of cylindrical portion 224a integral with diaphragm 210 will come into contact with electrode 216, thus the output signal from sensor will again become "on".

Hence it is possible to provide "off" signals as long as the fluid pressure is within a predetermined range, and "on" signals when the fluid pressure is otherwise.

The contents of counter 22 appear as one input to and gate 35. In the embodiment shown in FIG. 1, the outputs of flip-flops FF2 and FF4 are directly coupled to the input terminals of and gate 35, while the output of FF3 is coupled to one input terminal of and gate 32 through an inverter 34. Accordingly, it is seen that and gate 35 will generate an output signal when the binary value of the contents of counter 22 is 1010 or 1011. Clearly, any other number may be chosen by appropriately configuring the connection between counter 22 and and gate 35. A binary value of "1010" indicates a decimal value of 10 and a binary value of "1011" indicates a decimal value of 11. Thus, these binary values indicate that either 10 or 11 pulses have been sent from clock 20 to counter 22. The number of pulses sent to counter 22 is 9 or less or 12 or more, no output is generated by and gate 35. As will be described below, unless the vehicle operator terminates the constant task performance test when the count is either 10 or 11, the counter is reset to its initial state without the production of a validity signal and the constant task test must be attempted again.

The output terminal of and gate 35 is coupled to one of the input terminals of and gate 36. The other input terminal of and gate 36 is coupled to sensing means 10 through an inverter 38. When sensing means 10 is generating an "off" signal, a false signal is coupled to and gate 36 through inverter 38. Only when sensing means 10 is generating an "on" signal, will and gate 36 receive a true signal through inverter 38. When the vehicle operator terminates the steady control test, sensing means 10 is switched "on," and and gate 36 will receive a true input signal. Accordingly, if the vehicle operator terminates the steady control test and the number of pulses registered by counter 22 is 10 or 11, the output signal generated by and gate 35 will also be true. Thus and gate 36 will generate a validity signal. The output terminal of and gate 36 is coupled to changeover circuit 28. Changeover circuit 28 switches its output signal from terminal 28a to 28b and responds to a true input signal from and gate 36. Thus, and gate 24 will generate a false output and lamp 26 will remain extinguished.

Output terminal 28b is coupled to one input terminal of and gate 40. Furthermore, the other input terminal of and gate 40 is coupled through inverter 33 to alternator 32. The output terminal of and gate 40 is coupled to a relay circuit 42 which forms an engine locking means and may include a thyristor, resistor and other well known buffer circuitry to translate the signal from and gate 40 at an appropriate form for use in relay circuit 42. Additional modifications and alterations may be made in order to couple the logic state output of and gate 40 to circuit 42 according to principles well known to the art. When a true output is generated by and gate 40, a relay coil 44 is energized and a normally open relay contact 46 is switched "on". Relay contact 46 of relay circuit 42 is interposed between the ignition switch 48 and starter motor 50. Circuit 42 will prevent the starting of the engine as long as no true output is generated by and gate 40. The output of and gate 40 is also coupled to an indicator 52, typically an incandescent lamp. And gate 36 has an output indicative of the contents of counter 22 at the time at which the vehicle operator terminates the steady control test. If the test has been terminated at the predetermined count, and gate 36 will generate a true output, otherwise the output of and gate 36 is false.

After the engine has been started in the conventional manner, alternator 32 generates a disabling signal which is coupled to and gates 24 and 40 through inverter 33. The disabling signal will close both gates.

The output of sensing means 10 is coupled to the reset terminal of each flip-flop, FF1, FF2, FF3 and FF4 of counter 22 via a delay circuit 54. Delay circuit 54 has a short time delay, such as approximately one tenth to two tenths of a second and is faster than the normal reaction times of the vehicle operator. Yet the time delay of circuit 54 is substantially greater than any of the logic response times within the circuit shown in FIG. 1. When sensing means 10 sends out an "on" signal, such as when the vehicle operator terminates the test, the contents of counter 22 are cleared after the delay time has elapsed. This delay time is necessary in order to insure that there is sufficient time for and gate 36 to test the contents of counter 22 through and gate 35. It will be noted that when the vehicle operator is unable to maintain the designated holding force during the steady control task, thereby causing movable contact 12 of sensing means 10 to make contact with one of fixed contacts 14a or 14b, the contents of counter 22 will automatically be reset requiring the reinitiation of performance on the steady control task.

The operation of the circuit as shown and described in FIG. 1 can be understood as follows. Before the engine is started, contact 46 of engine locking circuit 42 is in an "off" or open position. Thus, even if ignition switch 48 is turned to the "start" position, no current is supplied to starter motor 50 and it is impossible to start the engine. Furthermore, reset circuit 30 has sent a reset signal to changeover circuit 28 and the contents of counter 22 have been reset to 0000.

Under these conditions, when ignition switch 48 is turned to a position which activates the circuit of FIG. 1, each of the devices are supplied with a source of electrical current and clock 20 begins its internal oscillations. The vehicle operator applies a foot pressure to the brake pedal and controls the foot pressure such that lamp 26 begins to flash at intervals equal to the period of clock pulses from clock 20. The force of the vehicle operator's foot is detected by sensing means 10. Maintaining movable contact 12 of sensing means 10 in an "off" state causes sensing means 10 to send out an "off" signal.

Successful performance of the steady control task as reflected in an "off" signal from sensing means 10 supplies and gate 18 with an input signal. The clock pulses from clock 20 are then counted by counter 22. The registration of counts in counter 22 is indicated by lamp 26 through gate 24, so that the vehicle operator is able to confirm the successful performance of his steady control test. If the steady control holding force of the vehicle operator changes, causing sensing means 10 to be switched "on," counter 22 is reset and the test must be reinitiated.

The vehicle operator is presented with the task of counting the number of times indication is made by lamp 26, that is the number of pulses counted by counter 22, until a designated value is reached. In the embodiment shown in FIG. 1, the number of counts has been arbitrarily chosen at 10 or 11. The vehicle operator must count the number of times indicator lamp 26 flashes as well as applying a steady force to the brake pedal. The number of flashes of indicator 26 has reached a designated number, the vehicle operator terminates the steady control test. Termination of the steady control test causes sensing means 10 to send out an "on" signal. This signal is sent to and gate 36.

And gate 36 also receives a signal based on the contents of counter 22 at this time. Counter 22 is not reset by virtue of the delay introduced by delay circuit 54. And gate 36 generates an output signal only if the contents of counter 22 have a decimal value of 10 or 11. Thus, contact 46 of engine locking circuit 42 is switched "on" and is maintained in this position. Since lamp 52 is lit at this time, the vehicle operator is able to determine that the results of his performance on the steady control task were favorable. Under these conditions, if the vehicle operator turns ignition switch 48 to the starter terminal, he may operate starter motor 50 and start the engine in the conventional fashion. After the engine has started, alternator 32 generates an output voltage thereby closing and gates 24 and 40. Thus, lamps 26 and 52 are extinghished.

It would also be possible with the present invention to positively eliminate the improper operation of the vehicle by requiring the vehicle operator to perform a more complex calculating operation, in which he may count the number of flashes of an indicating lamp during each of several steady control tasks in which he must continuously maintain a predetermined holding force for a predetermined duration.

Indicators 26 and 52 may be constructed with red or green incandescent lamps, with warning buzzes or any other cognizable signal. Furthermore, it would also be possible to construct sensing means 10 as a load cell installed in the brake or clutch system. Finally, an engine locking circuit could also be constructed such that it controls the supply of current to the ignition coil rather than the starter motor as shown in FIG. 1.

Many further embodiments and modifications may be made to both of the embodiments of the present invention as shown in FIG. 1 without departing from the spirit and scope of the present invention.

I claim:

1. An apparatus for prohibiting operation of a motor vehicle by a person with impaired motor ability comprising:

an operating force sensor giving a vehicle driver a static regulation test whereby said driver must exert a predetermined force on said sensor for a predetermined time, said sensor comprising a hydraulic switch provided in a brake pipe which comprises a movable contact which is movable in accordance with a brake pedal and connected to an electric source and stationary contacts provided at given intervals at opposite sides of said movable contact and which are grounded;

a pulse generator for generating pulses with a given period;

a first AND circuit provided between said operating force sensor and said pulse generator and having its inputs coupled to said movable contact and an output of said pulse generator;

a counting circuit which is connected to an output of said first AND circuit and which counts output pulses thereof;

a judging circuit which is connected to an output end of said counting circuit, said judging circuit judging if a counted value of the counting circuit meets a given value and sends out an output only when the counting value meets given value;

a second AND circuit provided between said judging circuit and said operating force circuit having one input connected to an output of said judging circuit and the other input coupled to said movable contact via an inverter;

a transfer circuit having a first and second outputs, said transfer circuit having an input coupled to an output of said second AND circuit, said transfer circuit normally producing only an output signal on said first output, said transfer circuit further only producing an output signal on said second output when said second AND circuit generates an output signal;

a third AND circuit having its inputs coupled to said first output of said transfer circuit, said first AND circuit and an electric generator through an inverter;

a first indicator which is connected to an output of said third AND circuit indicates the operating condition of said operating force sensor and which comprises a lamp which flashes in accordance with the output pulses of said first AND circuit whereby said vehicle driver counts the number of flashes and releases the pressure applied to the operating force sensor when said driver has counted said given value of flashes;

a fourth AND circuit having its inputs coupled to said electric generator via an inverter and said second output of said transfer circuit;

a second indicator which is connected to an output of said fourth AND circuit indicates that the driver has applied said predetermined force on said sensor for said predetermined time and has counted the given value of flashes of said first indicator; and a relay circuit which is connected to an output of said fourth AND circuit in parallel with said second indicator, said relay circuit comprising an ignition switch, a normally open contact for controlling electric conduction with a starter motor and a coil for operating said normally open contact.

* * * * *